Aug. 28, 1962 W. C. PAYNE 3,051,383

DIAL COMPUTER

Filed Sept. 16, 1955 2 Sheets-Sheet 1

William C. Payne
INVENTOR.

BY Clarence A. O'Brien
and Harvey B. Jacobson
Attorneys

Aug. 28, 1962 W. C. PAYNE 3,051,383

DIAL COMPUTER

Filed Sept. 16, 1955 2 Sheets-Sheet 2

William C. Payne
INVENTOR.

BY Clarence A. O'Brien
and Harvey B. Jacobson
Attorneys

United States Patent Office 3,051,383
Patented Aug. 28, 1962

3,051,383
DIAL COMPUTER

William C. Payne, Miami, Fla.
(Box 2423, Marathon Shores, Fla.)

Filed Sept. 16, 1955, Ser. No. 534,659
5 Claims. (Cl. 235—78)

This invention relates to computers of the type which involve a pair of circular disks movable with respect to each other and particularly to a bookkeeping device which utilizes this principle.

The primary object of this invention is to provide an easily operable computer to eliminate the necessity for daily bookkeeping machine posting in that it provides an automatic old balance pick-up as well as an automatic new balance after each individual computer operation. This enables a bookkeeper to handle with safety and ease, considerably more accounts than the same bookkeeper can handle with presently used systems. In view of this, savings will accrue to the bank adopting the instant computer.

A further object of this invention is to provide a computer-envelope package which is easily filed and provides space to retain pertinent information, identification, drafts, checks, deposit tickets and other papers, the computer portion being readily operable to maintain a running account of the financial activity of a bank customer.

A more specific object of the invention is to provide a computer as aforesaid, the computer having a rotatable balance disk calibrated in dollars together with a removable computer disk having a clutch element thereon engageable with a clutch element on the balance disk so that one computer disk may be used for any number of customers, and specifically, used in connection with his balance dial preferably mounted on its envelope.

Another object of the invention is to provide a circular type computer especially useful in bank bookkeeping operations, but not exclusively limited thereto inasmuch as it may be used in connection with other businesses and adopted for other accounting procedures, the computer including a calibrated disk with which a removable balance disk is operatively connected, the latter being rotatable after having been applied to the balance dial in the correct relative position, in order to rotate both disks simultaneously to the new, adjusted position. Upon removal of the computer disk, the balance disk is readable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3:
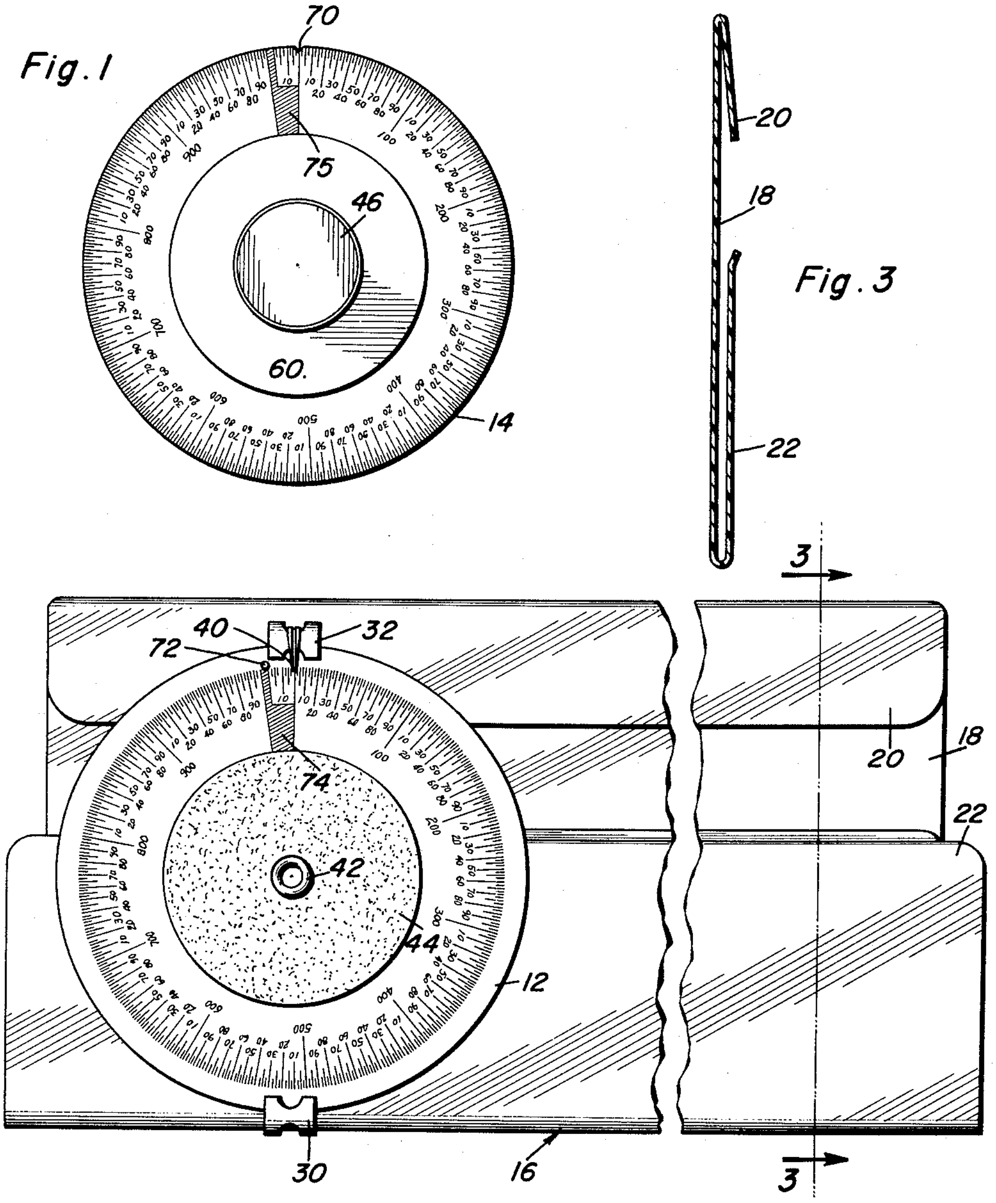
FIGURE 1 is a top view of the computer disk constituting a portion of the computer.
FIGURE 2 is a top view of the balance disk attached to a base, in this instance, the base being a plastic envelope in which to store pertinent information.
FIGURE 3 is a transverse sectional view taken on the line 3—3 of FIGURE 2 and in the direction of the arrows.

The circular computer 10 comprises a lower disk 12 and an upper disk 14. The lower disk is calibrated in circular formation, and when the computer is used as a bookkeeping device, the calibrations will represent dollars. A base for the disk 12 is attached to it and preferably consists of an envelope 16 having a back wall 18, an upper short flap 20, and a lower longer flap 22 with its upper edge spaced from the lower edge of the shorter flap 20. The plastic material forming the envelope 16 is sufficiently stiff to retain its shape, but may be flexed enough to insert and remove bank checks, drafts, deposit tickets and any other pertinent material which the bank may select for insertion thereinto.

A mounting bracket consisting of a strip 26 is passed through an opening 28 in the envelope 16 at the juncture of the flap 28 with the back 18. Bracket 26 has a U-shaped end 30 in which a peripheral edge of the disk 12 is adapted to slide, and a similarly shaped end 32 diametrically opposite the U-shaped end 30, both the ends 30 and 32 functioning as guides for the disk 12 and helping to retain it properly in place.

Strip 26 is fastened to the flap 22 by eyelet 34 which passes through one of the apertures in the strip 26. Eyelet 36 is attached to the strip 26 and has a shank 38 connected to it, the outer end of the shank constituting a pointer 40 after passing over the peripheral edge of the disk 12. A central eyelet 42 is passed through an aperture in strip 26, an aligned aperture in flap 22, a central aperture in disk 12 and an aperture in the clutch element 44. Clutch element 44 consists of a plate made of cork, rubber or other similar material possessing a high coefficient of friction, and is preferably restricted to the center part of the disk 12.

The computer disk 14 is graduated on one surface with indicia which are identical to the indicia on the disk 12. On the same surface with the indicia there are means for rotating disk 14. They consist of a knob 46 having a central recess 48 in which to accommodate a nut 50 on the shank 54 of a spindle which has a head 56. This head protrudes beyond the rear surface of disk 14 and is removably mounted in the bore of eyelet 42 thereby mounting the disk 14 for pivotal rotation on the device. A spacer block 58 is fastened, as by screws 59, to the disk 14 and has a cover 60 on which the knob 46 is mounted. The same screws 59 that hold the spaced block and cover 60 in place on disk 14 may be used to hold the knob 46 in place.

Figures 5, 6:
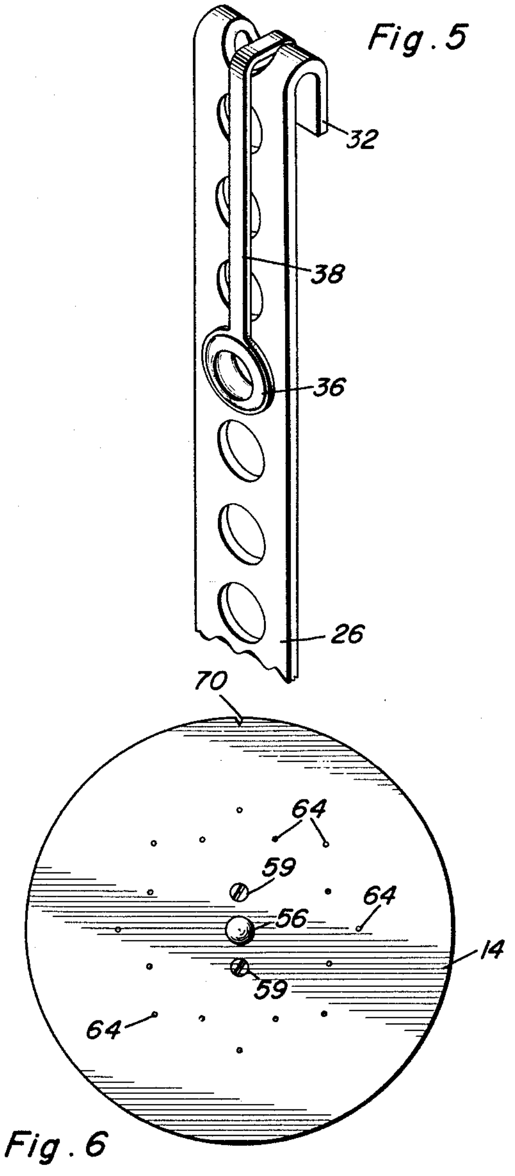
FIGURE 5 is a perspective view of a clamp used to fasten the balance dial to the envelope base.
FIGURE 6 is a bottom view of the balance computer showing the reverse side from that illustrated in FIGURE 1.

A complemental clutch element consisting of a number of projections 64, is connected with disk 14. These projections may be formed in several ways, one being to use nails which pass through the spacer block 58 and the disk 14 and in a reasonably orderly pattern (FIGURE 6). The clutch element formed by the projections 64 is engageable with the clutch element 44 in order to drivingly connect the disks 12 and 14 so that movement of disk 14 directly causes a corresponding movement of disk 12.

A zero notch 70 is formed in the disk 14 at the periphery thereof at the zero position. Disk 14 is calibrated suitably for the purpose to which the computer is placed. For example, for special checking accounts in banks, it is suggested that the disk 14 be calibrated to the numeral "1000" with the notch 70 at the zero position. Then, the disk 12 is to be calibrated in an identical manner.

Figure 4:
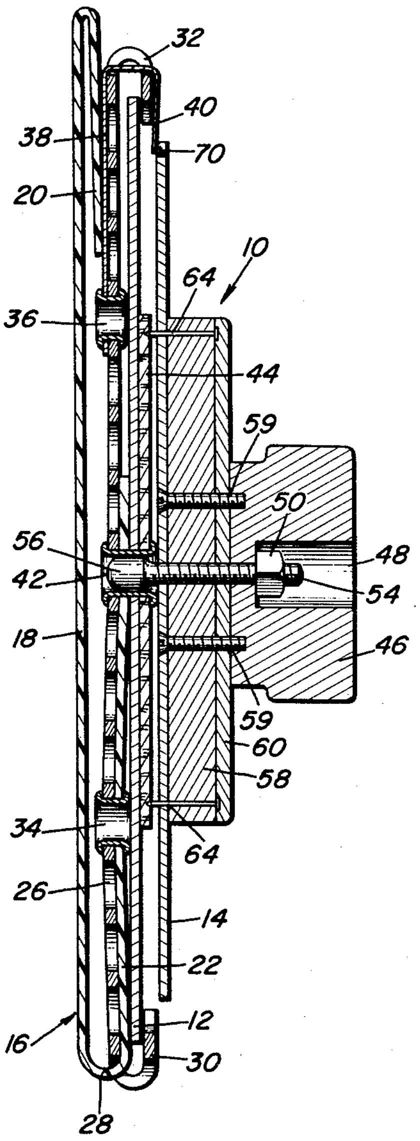
FIGURE 4 is a longitudinal sectional view of the assembled computer and its envelope.

In using the device, assume that a new bank account is to be opened. Disk 12 is rotated until the zero mark is aligned with the pointer 40, this mark being adjacent to the stop 72. This stop is adapted to abut the pointer 40 in order to prevent over-travel of the lower disk 12. Now, if a depositor opens an account with a deposit of $150.00, the disk 12 is rotated until the pointer indicates "150." This may be done directly or by use of the disk 14. Now, it is assumed that the depositor draws a check on his account in the amount of $100.00. To keep a running balance indicated on the disk 12, the disk 14 is assembled as shown in FIGURE 4, that is, the enlargement 56 of the spindle is inserted in the bore of eyelet 42, and the disk 14 is rotated freely until the "100" marking is in alignment with the pointer 40. Then, disk 14 is pressed lightly to engage projections 64 constituting one clutch element with plate 44 that constitutes the other clutch element. Knob 46 is rotated clockwise until notch 70, which is at the zero marking on disk 14, is aligned with the pointer 40. Then, the disk 14 is removed and the balance of $50.00 is read directly from the scale on disk 12, that is, the numeral "50" will be in alignment with the pointer 40. An additional check drawn on this depositor's account is recorded in the same way. Deposits are recorded by following the same procedure, with the exception that the disk 14 is started with notch 70, which is at the zero marking on disk 14, being first freely aligned with the pointer 40, and with knob 46 being engagingly rotated counter-clockwise until the proper marking, representing the amount of the deposit, is in alignment with the pointer 40.

This operation, continued daily, will provide the bank with an approximate balance for each account, thereby preventing wrongful dishonor of checks as well as the paying of overdrafts without the knowledge of the bank. It is not intended that this device take the place of permanent records, but that it be used as a perpetual rapid check system for accounts.

The stop 72 is positioned slightly behind the zero marking on disk 12, and the space between the stop 72 and the zero position on disk 12 indicates an overdrawn account. The shaded area 74 on disk 12 and the corresponding shaded area 75 on disk 14 indicate this overdrawn area for the information of the user of the computer.

In a banking use, the envelope 16 together with disk 12 may be filed away as a unit. Inasmuch as the disks 12 of each unit will be identical, the same disk 14 and its assembly thereon may be used for actuating each computer. In other words, a teller or bookkeeper or any other person using the computer may have at his disposal only one disk 14 for use with any number of disks 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a balance computer for a bank account, a first disk having calibrations readable in dollars, a bracket constituting a base for said disk, a hollow eyelet rotatably fastening said disk to said base, a second disk calibrated identically to the first mentioned disk, means mounting said second disk in superposition to said first disk and for rotation with respect thereto, said mounting means including a spindle provided with a head which is rotatable and slidable in said hollow eyelet, a clutch between said disks which is manually engageable by depressing said second disk on said first disk so that said second disk may be freely rotated to minus and plus positions which represent withdrawals and deposits respectively, and then engaged with the first disk so that rotation of said second disk will result in a corresponding rotation of said first disk in order to total the transactions and show the result by the final position of rotation of said first disk, a reference device attached to said base and operatively connected with said second disk from which to read the results from said first disk, said clutch comprising a member composed of soft material secured to one disc, a sharp rigid member secured to the other disc, one of said clutch members adapted to move when said second disc is depressed so as to cause said sharp member to penetrate the member of soft material.

2. In a balance computer for a bank account, a first disk having calibrations readable in dollars, a bracket constituting a base for said disk, a hollow eyelet rotatably fastening said disk to said base, a second disk calibrated identically to the first mentioned disk, means mounting said second disk in superposition to said first disk and for rotation with respect thereto, said mounting means including a spindle provided with a head which is rotatable and slidable in said hollow eyelet, a clutch between said disks which is manually engageable by depressing said second disk on said first disk so that said second disk may be freely rotated to minus and plus positions which represent withdrawals and deposits respectively, and then engaged with the first disk so that rotation of said second disk will result in a corresponding rotation of said first disk in order to total the transactions and show the result by the final position of rotation of said first disk, a pointer overlying a portion of said first disk, said second disk being smaller in diameter than said first disk so that said pointer is operable with said second disk as well as said first disk, said clutch comprising a member composed of soft material secured to one disc, a sharp rigid member secured to the other disc, one of said clutch members adapted to move when said second disc is depressed so as to cause said sharp member to penetrate the member of soft material.

3. The balance computer of claim 2 wherein said bracket comprises an elongated rigid plate and has cantilevered ends, said pointer located at one end of said bracket, and a guide at the opposite end of said bracket and in contact with said first disk to constrain the movement of said first disk.

4. In a computer, a first disc having calibrations thereon, a base, a second disc adjacent said first disc having calibrations thereon, axle means mounting said discs for independent and simultaneous co-axial rotation on said base, manually operable positive clutch means connected to said discs, said clutch means including clutch members adapted to positively couple said discs together in any relative angular position so as to positively prevent relative rotation therebetween, one of said clutch members comprising a solid member of relatively soft material connected to one disc and the other clutch member comprising a rigid member considerably harder than the relatively soft member, said rigid member having a pointed end adapted to pierce the surface of the relatively soft member.

5. A device as defined in claim 4 wherein the clutch automatically remains in the engaged position until the clutch members are forced apart by the manual means.

References Cited in the file of this patent

UNITED STATES PATENTS

| | | |
|---|---|---|
| 1,156,770 | Fritz | Oct. 12, 1915 |
| 2,429,277 | Reynolds | Oct. 21, 1947 |
| 2,459,799 | Doyle | Jan. 25, 1949 |
| 2,634,913 | Sawyer | Apr. 14, 1953 |
| 2,690,246 | Kelleigh | Sept. 28, 1954 |

FOREIGN PATENTS

| | | |
|---|---|---|
| 4,131 | Great Britain | Oct. 11, 1879 |
| 372,746 | Great Britain | May 8, 1932 |